Patented Aug. 25, 1925.

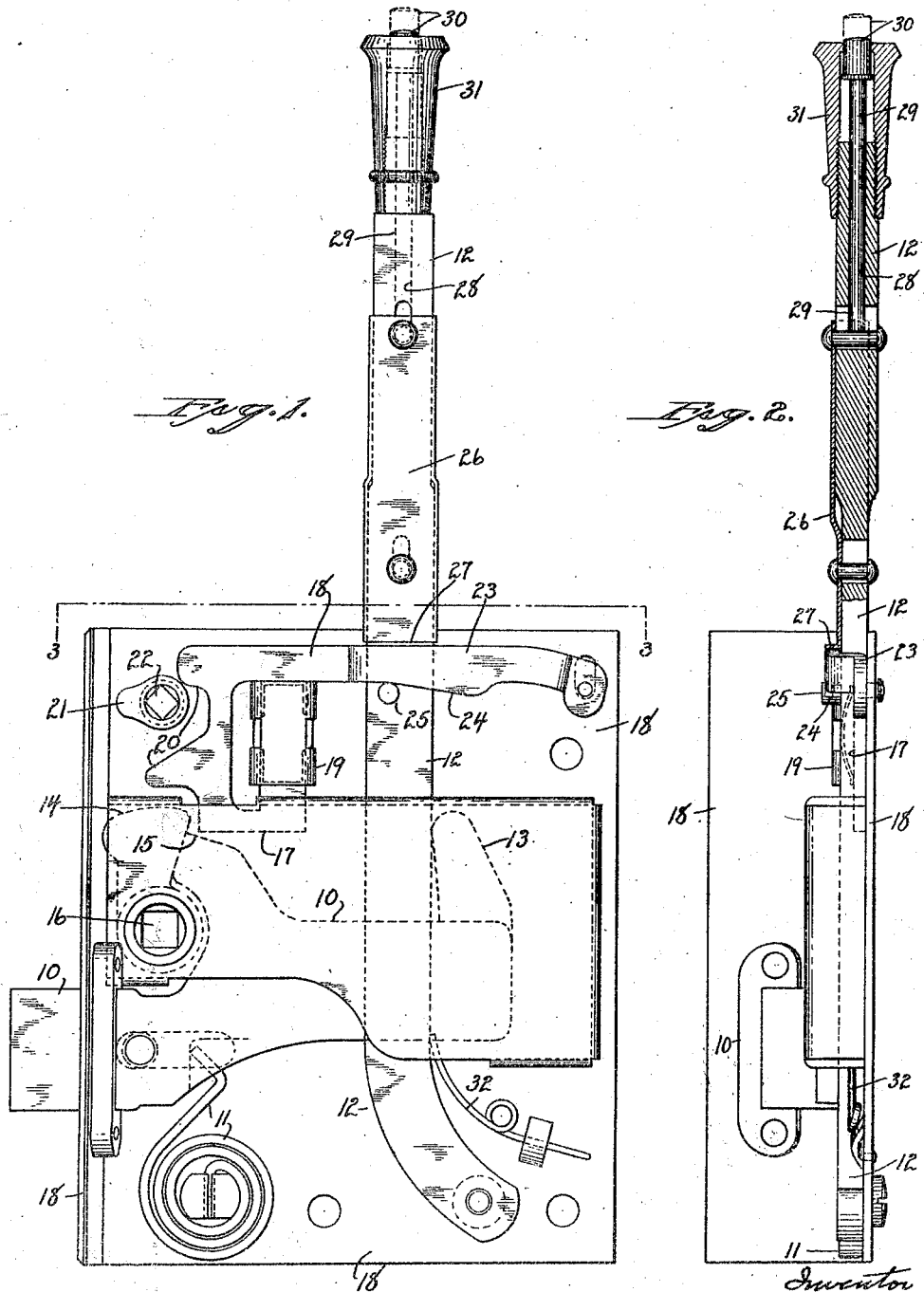

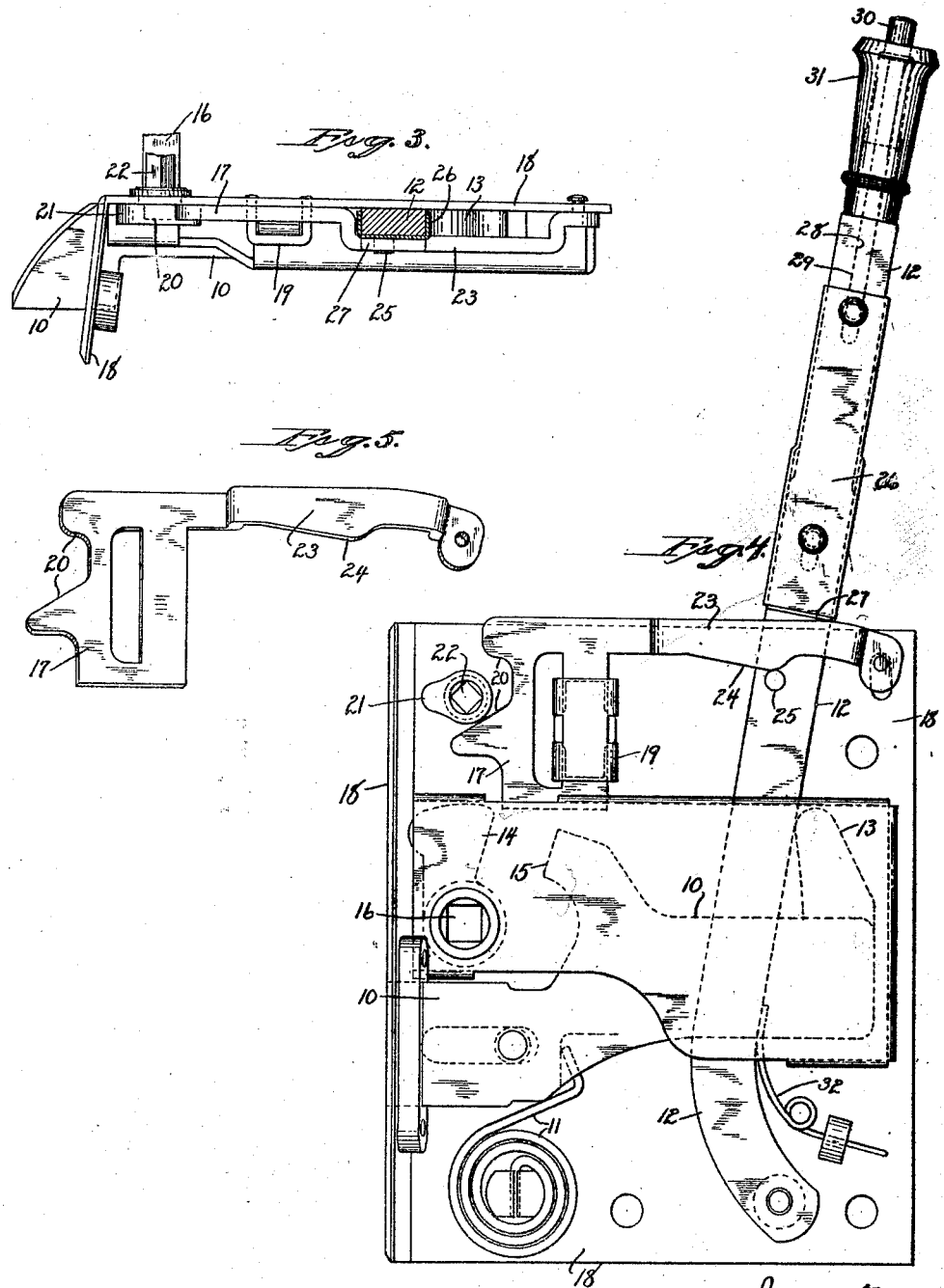

1,551,032

UNITED STATES PATENT OFFICE.

RICHARD V. KAIMER, OF NEW HAVEN, CONNECTICUT, ASSIGNOR TO THE ENGLISH & MERSICK CO., OF NEW HAVEN, CONNECTICUT, A CORPORATION.

LATCH FOR VEHICLE DOORS.

Application filed February 5, 1925. Serial No. 6,923.

*To all whom it may concern:*

Be it known that I, RICHARD V. KAIMER, a citizen of the United States, residing at New Haven, in the county of New Haven and State of Connecticut, have invented a new and useful Improvement in Latches for Vehicle Doors; and I do hereby declare the following, when taken in connection with the accompanying drawings and the characters of reference marked thereon, to be a full, clear, and exact description of the same, and which said drawings constitute part of this application, and represent in—

Fig. 1 a plan view of a latch for vehicle doors constructed in accordance with my invention, and shown in the locked position.

Fig. 2 an edge view of the same, with the operating-lever partly in section.

Fig. 3 a sectional view on the line 3—3 of Fig. 1.

Fig. 4 a plan view with the latch-bolt in its retired position.

Fig. 5 a perspective view of the locking slide, detached.

This invention relates to improvement in latches for vehicle doors, and particularly to latches which are provided with means whereby the latch-bolt may be locked in its thrown position, so that the door cannot be opened from the outside without a key. The object of the invention is to provide a simple arrangement of vehicle door latches in which the latch-bolt may be positively locked in its thrown position, and means mounted in the latch-operating lever for moving the latch-locking mechanism into position, and the invention consists in the construction as hereinafter described and particularly recited in the claims.

In carrying out my invention, I employ a latch-bolt 10, adapted to be thrown forward by a spring 11 and retired by means of a lever 12 acting against a projection 13 at the rear of the bolt, or by means of a handle roll-back 14 co-acting with a projection 15 near the forward end of the bolt, this roll-back 14 being adapted to be turned by the usual handle arranged outside the door and provided with a spindle 16 fitting the hub of the roll-back for turning it. Above the roll-back and adapted to be moved downwardly in rear thereof is a locking-slide 17, mounted on a case-plate 18 and guided for vertical movement by a guide 19. This locking-slide is formed with a cam-surface 20 projecting into the path of a cam 21 and mounted on a key-operated spindle 22 of usual construction. The arm 23 of the locking-slide is formed in its under-side with a cam 24, to be engaged by a stud 25 on the lever 12. On the lever 12 is a slide 26 guided for vertical movement on the lever and provided with a lip 27 to engage with the upper edge of the arm 23 of the locking-slide. The upper end of the lever is bored out to form a tubular chamber 28 for the reception of a push-pin 29 which is provided with a pushbutton 30 in an ornamental tip 31 secured to the upper end of the lever 12, which lever is normally thrown forward under tension of a spring 32. The latch-bolt 10 can be operated in the usual way, either by swinging the lever 12 rearward, so that it engages with the projection 13, or by turning the roll-back 14 through the handle on the outside of the door. To lock the latch-bolt, however, in its projected position, the pushbutton 29 is forced downward and the slide 26, engaging with the arm 23 of the locking-slide, forces that locking-slide downward into the path of the roll-back 14, so that, when the locking-slide is depressed, the latch-bolt cannot be moved from the outside. The locking-slide, however, can be withdrawn by the rearward movement of the lever, which causes the stud 25 to engage with the cam-edge 24, and thus raises it, and in this raising, the slide-arm 23, engaging with the lower end of the lever-slide 26, raises that slide, and hence again projects the push-button 29 above the upper end of the the lever-tip, in position for again depressing the locking-slide when so desired.

The locking-slide may also be depressed from the outside by turning the key-spindle 22, causing the cam 21 to engage with the cam-projection 20, and thus depressing the locking-slide into the path of the roll-back 14.

I thus provide a latch for vehicle doors with means operated by pushbutton in the lever to project the sliding block into the path of the roll-back, so as to prevent the movement of that roll-back from the outside of the door, and by the usual movement of the lever in withdrawing the latch-bolt, the push-pin is re-set into operative position.

I claim:

1. In a latch, the combination with a latch-bolt provided at its rear and near its forward end with projections, of a swinging lever engaging with the rear projection, a handle-operated roll-back adapted to engage with the forward projection, a locking-slide arranged above the roll-back in the path thereof, and a push-button mounted in the lever and adapted to depress said locking-slide into the path of the roll-back.

2. A latch, comprising a latch-bolt, and formed at its rear with an upward projection and near its forward end with an upward projection, a handle-operated roll-back adapted to engage the forward projection for retracting the bolt, a pivotally-mounted lever adapted to engage with the rear projection of the latch-bolt for retracting the same, said lever provided with a stud, a slide mounted on said lever, a push-pin mounted in the upper end of said lever and adapted to engage with said slide, whereby the slide may be depressed, said slide formed at its lower end with a lip, a vertically-movable slide mounted in the plane of the roll-back and formed with a rearwardly-extending arm passing between the stud on the lever and the lip on the lever-slide, said arm formed with a cam-surface to co-act with said stud.

3. A latch, comprising a latch-bolt, and formed at its rear with an upward projection and near its forward end with an upward projection, a handle-operated roll-back adapted to engage the forward projection for retracting the bolt, a pivotally-mounted lever adapted to engage with the rear projection of the latch-bolt for retracting the same, said lever provided with a stud, a slide mounted on said lever, a push-pin mounted in the upper end of said lever and adapted to engage with said slide, whereby the slide may be depressed, said slide formed at its lower end with a lip, a vertically-movable slide mounted in the plane of the roll-back and formed with a rearwardly-extending arm passing between the stud on the lever and the lip on the lever-slide, said arm formed with a cam-surface to co-act with said stud, said slide formed in its forward edge with a cam-surface, and a key-operated cam adapted to co-act therewith for depressing the said locking-slide.

In testimony whereof, I have signed this specification.

RICHARD V. KAIMER.